(12) United States Patent
Miyamori

(10) Patent No.: US 7,515,735 B2
(45) Date of Patent: Apr. 7, 2009

(54) IMAGE RECOGNITION SYSTEM AND IMAGE RECOGNITION PROGRAM

(75) Inventor: Hisashi Miyamori, Koganei (JP)

(73) Assignee: National Institute of Information and Communication Technology Incorporated Administrative Agency, Tokyo (JP)

( * ) Notice: Subject to any disclaimer, the term of this patent is extended or adjusted under 35 U.S.C. 154(b) by 735 days.

(21) Appl. No.: 10/552,143

(22) PCT Filed: Apr. 11, 2003

(86) PCT No.: PCT/JP03/04672

§ 371 (c)(1),
(2), (4) Date: Oct. 7, 2005

(87) PCT Pub. No.: WO2004/093015

PCT Pub. Date: Oct. 28, 2004

(65) Prior Publication Data

US 2007/0104368 A1    May 10, 2007

(51) Int. Cl.
*G06K 9/00* (2006.01)
(52) U.S. Cl. .................................... 382/103
(58) Field of Classification Search .............. None
See application file for complete search history.

(56) References Cited

U.S. PATENT DOCUMENTS 6,072,494 A * 6/2000 Nguyen ............... 715/863

(Continued)

FOREIGN PATENT DOCUMENTS

JP    9-313660    12/1997

(Continued)

OTHER PUBLICATIONS

Hisashi Miyamori "Improvement of Behavior Identification Accuracy for Content-based Retrieval by Collaborating Audio and Visual Information", Information Processing Society of Japan Kenkyu Hokoku, Mar. 8, 2002, vol. 2002, No. 26, p. 89.

(Continued)

*Primary Examiner*—Matthew C. Bella
*Assistant Examiner*—Alex Liew
(74) *Attorney, Agent, or Firm*—Westerman, Hattori, Daniels & Adrian, LLP.

(57) ABSTRACT

An image recognizing device for recognizing the motion of a player on the basis of a content containing a sport in which players play in zones demarcated with an obstacle such as a net, including a video information acquiring section for acquiring video information representing the motion of the player in play from the content, a hidden state judging unit for judging whether or not a use tool such as a ball moving between the zones and being an object of scoring is in a hidden state by a predetermined object, a hit time information determining section for determining the time at which the use tool hits on the basis of the hiding start time at which the use tool is judged to be hidden by the hidden state judging section and the hiding stop time at which the hiding is judged to be stopped, a rule information storage section in which rule information on the sport is stored, and an image content recognizing section for recognizing the image content including the motion of the player represented by the video information on the basis of the video information acquired by the video information acquiring section, the position of the use tool at the hit time determined by the hit time information determining section, and the rule information stored in the rule information storage section.

20 Claims, 15 Drawing Sheets

U.S. PATENT DOCUMENTS

| | | | |
|---|---|---|---|
| 6,141,041 A | 10/2000 | Carlbom et al. | |
| 6,215,890 B1 * | 4/2001 | Matsuo et al. | 382/103 |
| 6,567,536 B2 * | 5/2003 | McNitt et al. | 382/107 |
| 2002/0122115 A1 * | 9/2002 | Harmath | 348/157 |

FOREIGN PATENT DOCUMENTS

| | | |
|---|---|---|
| JP | 11-339009 | 12/1999 |
| WO | 02/053232 A2 | 7/2002 |

OTHER PUBLICATIONS

Miyamori, H.; "Improving Accuracy in Behaviour Identification for Content-based Retrieval by Using Audio and Video Information"; Pattern Recognition, 2002 Proceedings, vol. 2, pp. 826-830, Aug. 11, 2002.

Pingali, Gopal S. et al; "Real Time Tracking for Enhanced Tennis Broadcasts"; Pattern Recognition, 1998. Proceedings, pp. 260-265, Jun. 23, 1998.

Sudhir, G.; "Automatic Classification of Tennis Video for High-level Content-based Retrieval"; Content-Based Access of Image and Video Database, pp. 81-90, 1998.

Pingali, Gopal S. et al.; "Instantly Indexed Multimedia Databases of Real World Events"; IEEE Transactions on Multimedia, vol. 4, No. 2, pp. 269-282, Jun. 1, 2002.

Intille, Stephen S. et al.; "Closed-World Tracking"; Computer Vision, pp. 672-678, Jun. 20, 1995.

European Search Report dated Jul. 10, 2008, issued in corresponding European Patent Application No. 03717571.8.

* cited by examiner

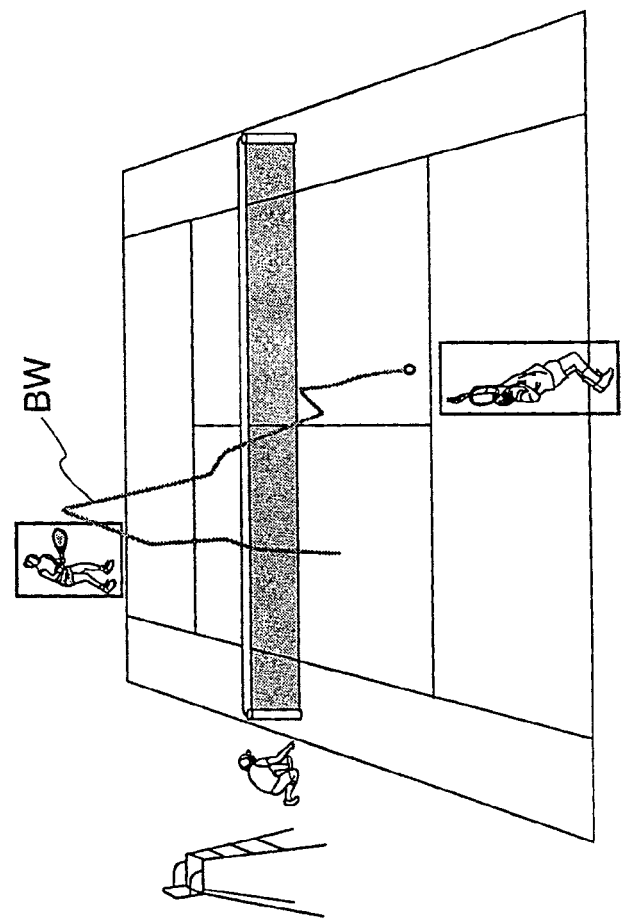

Fig. 9

| rule information index | rule information |
|---|---|
| serving | A server stands with his or her both legs lending on a ground behind the base line toward the net and between a virtual extension of the center mark and a virtual extension of the side line just prior to initiating a serving. The server tosses a ball with his or her hand at any direction in the air and hits the ball with a racket before the ball drops on the ground. The serving is considered to be completed at the moment the ball makes a contact with the racket. |
| ball dropping on the court line | A ball drops on the court line is considered to drop in the court sectioned by the court line. |
| ... | ... |

IMAGE RECOGNITION SYSTEM AND IMAGE RECOGNITION PROGRAM

FIELD OF THE ART

This invention relates to an image recognition system that can preferably image-recognize an image content in a content regarding a sport such as a broadcasted sport program that has been difficult to recognize.

BACKGROUND ART

Recently, digital video information that a user can use in various fields has been steadily growing. In conjunction with a development of the Internet society, computer equipment, communication environment and/or interface has been speeded up in a broader area, and various visual data has been accumulated ubique in large quantity, which gives more importance to image summarizing technology that makes it possible to access flood of information and to watch only a part that a user wants to watch in a short period of time.

For example, in case of extracting an image requested by a user from each scene of a sport video such as tennis, the following two methods can be conceivable as a method for recognizing an image content such as "passing success" or "smash success"; one of the methods is by inputting which segment of the visual information is "passing success" or "smash success" by hand on a case-by-case basis, and the other method is by extracting each position of the ball, the player, and the court line by the use of a computer and by determining a time change of a spatial relative relationship comprehensively.

In case of image recognition by means of inputting the image content by hand, it is possible to recognize the image without fail, however, there are problems such that a labor cost is increased or it bears a heavy burden for a worker to process a long content. In addition, in case of automatic recognition of the image by the use of the computer, if visual information alone is set to be an object to be processed, there is a problem; when the ball overlaps or is hidden by the player or the net, tracking the ball is failed, which creates a part where an important position or time cannot be specified, resulting in failure of detecting an event to be image-recognized or resulting in failures of image-recognition.

DISCLOSURE OF THE INVENTION

In order to solve the above-mentioned problems, the present claimed invention takes following measures.

More specifically, the present claimed invention is an image recognition system that recognizes motions of players of a sport playing between areas partitioned by an obstacle such as a net from a content of its on-air program, of its material video before broadcasted, or recorded by a recording media such as a VTR, and is characterized by comprising a visual information obtaining part that obtains visual information on which a motion of the player in at least one area during a match is shown from the content, an occlusion state determining part that determines whether or not a used material such as a ball that moves between the areas included in the visual information obtained by the visual information obtaining part and that is an object to count the score of the relevant sport is in a state being hidden by a predetermined object body, an impact time information specifying part that specifies an impact time when the used material is hit based on an occlusion start time when the occlusion state determining part determines that the used material changes its state from not being hidden by the object body to being hidden by the object and an occlusion release time when the occlusion state determining part determines that the used material changes its state from being hidden by the object body to not being hidden by the object, a rule information storing part that stores rule information to conduct the relevant sport, and an image content recognizing part that recognizes an image content including the motion of the player shown by the visual information based on the visual information obtained by the visual information obtaining part, a position of the used material at the impact time specified by the impact time information specifying part and the rule information stored in the rule information storing part.

In accordance with the arrangement, in case that the image recognition is difficult, for example, a position of a used material is difficult to specify because the used material overlaps or is hidden by an obstacle such as a player or a net in the image, since the impact time information specifying part specifies the impact time when the used material is hit based on the occlusion start time when the occlusion state determining part determines that the used material is transferred from the state that the used material is not hidden by the object to the state that the used material is hidden by the object and the occlusion release time when the occlusion state determining part determines that the used material is transferred from the state that the used material is hidden by the object to the state that the used material is not hidden by the object, and furthermore the image content recognizing part specifies the motion of the player without fail based on the specified impact time, the visual information on which the motion of the player during the match is shown and the rule information to conduct the relevant sport, it is possible to provide the image recognition system that is superior in image recognition without recognition failures of a forehand swing, a backhand swing and an overhead swing due to, for example, overlapping or hiding of the used material.

In order to preferably specify the occlusion start time and the occlusion release time, it is desirable that the occlusion state determining part comprises a distance determining part that determines whether or not the used material locates within a predetermined distance from the object body and an occlusion start and release time specifying part that specifies a moment when the distance determining part determines that the used material locates within the predetermined distance from the object body and the used material changes its state from not being hidden by the object body to being hidden by the object body as the occlusion start time and that specifies a moment when the distance determining part determines that the used material locates within the predetermined distance from the object body and the used material changes its state from being hidden by the object body to not being hidden by the object body as the occlusion release time.

In addition, as a preferable embodiment of the present claimed invention, it is represented that the impact time shown by $t_a$, the occlusion start time shown by $t0$ and the occlusion release time shown by $t1$ have a relationship shown by the following expression (Expression 1)

$$t_a = a \times t0 + (1-a) \times t1 \quad \text{(Expression 1)}$$

where the parameter a is $0 \leq a \leq 1$.

In addition, in order to extract a distinctive motion of the player from the content, it is desirable that the visual information obtaining part comprises a domain element extracting part that extracts used facilities information such as the obstacle like the net or a boundary line showing a boundary between the areas and outside the areas, player position information showing a position of the player and used material information showing the used material that moves between the areas and that becomes the object to count the score of the relevant sport from the visual information.

In this case, in order to extract the distinctive motion of the player from the content more effectively, it is desirable that the player position information is position information showing a region including the player and a tool that the player always holds and uses during the match.

Furthermore, as a concrete embodiment to extract the player position information from the visual information in accordance with this invention, it is represented that the domain element extracting part extracts the player position information from the visual information based on the used facilities information extracted by the domain element extracting part. In addition, as a concrete embodiment to extract the used material information from the visual information, it is represented that the domain element extracting part extracts the used material information from the visual information based on the used facilities information and the player position information extracted by the domain element extracting part.

In addition, in order to extract the content element regarding its field from the content preferably, it is desirable that the used facilities information, the player position information, the used material information and the rule information are based on knowledge regarding a sport item to be a target to extract the image.

In order to make it possible to recognize the image more accurately, it is desirable to comprise an audio information obtaining part that obtains audio information synchronous with the visual information, such as an impact sound generating at a time when the used material such as the ball that moves between the areas and that is an object to count the score of the relevant sport is hit from the content, wherein the impact time information specifying part specifies the impact time based on a combination of the occlusion start time and the occlusion release time and the audio information obtained by the audio information obtaining part.

As a method for specifying the impact time, it is represented that the impact time information specifying part specifies a time when the audio information shows a value bigger than a predetermined level as the impact time.

In addition, in order to eliminate a noise sound other than the impact sound included in the audio information, it is desirable that the audio information obtaining part comprises a filtering part that passes a predetermined frequency band and the audio information is the information that has passed through the filtering part, and especially, in order to preferably eliminate a sound generating at a time when shoes of the player rasp against the court, a sound of the wind or an environmental sound such as other undesired sound, it is desirable that the filtering part consists of a band-pass filter.

Furthermore, in order to specify the impact time effectively, it is desirable that the impact time information specifying part specifies the impact time based on an impact sound candidate data having a predetermined time including the impact sound extracted from the audio information.

In addition, in order to extract the impact time without fail, it is desirable that multiple pieces of impact sound candidate data are extracted from the audio information so that an impact sound candidate data at one time and an impact sound candidate data at its subsequent time have a time that overlaps each other and the impact time information specifying part specifies the impact time based on the multiple pieces of the impact sound candidate data. Furthermore, at this time if it is so arranged that each of the multiple pieces of the impact sound candidate data has an identical data length and the multiple pieces of the impact sound candidate data are extracted from the audio information at intervals of a certain period, it is possible to extract the impact sound efficiently.

Furthermore, in order to decide the time when the impact sound generates more securely, it is desirable to comprise an impact sound pattern information storing part that stores impact sound pattern information that is a patternized sound change due to a state under which the used material is hit by the tool such as a racket that the player always holds and uses during the match, wherein the impact time information specifying part specifies the impact time based on the impact sound pattern information stored in the impact sound pattern information storing part and the audio information.

As another preferable embodiment of the present claimed invention, represented is an image recognition system that recognizes motions of players of a sport playing between areas partitioned by an obstacle such as a net from a content of its on-air program, of its material video before broadcasted, or recorded by a recording media such as a VTR, and that comprises a visual information obtaining part that obtains visual information on which a motion of the player in at least one area during a match is shown, an occlusion state determining part that determines whether or not a used material such as a ball that moves between the areas included in the visual information obtained by the visual information obtaining part and that is an object to count the score of the relevant sport is in a state being hidden by a predetermined object body, an impact time information specifying part that specifies an impact time when the used material is hit based on an occlusion start time when the occlusion state determining part determines that the used material changes its state from not being hidden by the object body to being hidden by the object and an occlusion release time when the occlusion state determining part determines that the used material changes its state from being hidden by the object body to not being hidden by the object, and an image content recognizing part that recognizes an image content including the motion of the player shown by the visual information based on the visual information obtained by the visual information obtaining part, and a position of the used material at the impact time specified by the impact time information specifying part.

In order to improve an accuracy of the image recognition, it is desirable to comprise an audio information obtaining part that obtains audio information synchronous with the visual information, such as an impact sound generating at a time when the used material such as the ball that moves between the areas and that is an object to count the score of the relevant sport is hit from the content, wherein the impact time information specifying part specifies the impact time based on a combination of the occlusion start time and the occlusion release time and the audio information obtained by the audio information obtaining part.

BRIEF DESCRIPTION OF THE DRAWINGS

FIG. 8 is a diagram showing tracking of a ball position in accordance with the embodiment.

FIG. 9 is a diagram showing a stored state of a rule information storing part in accordance with the embodiment.

BEST MODES OF EMBODYING THE INVENTION

One embodiment of the present claimed invention will be explained below with reference to FIG. 1 through FIG. 12.

Figure 1:
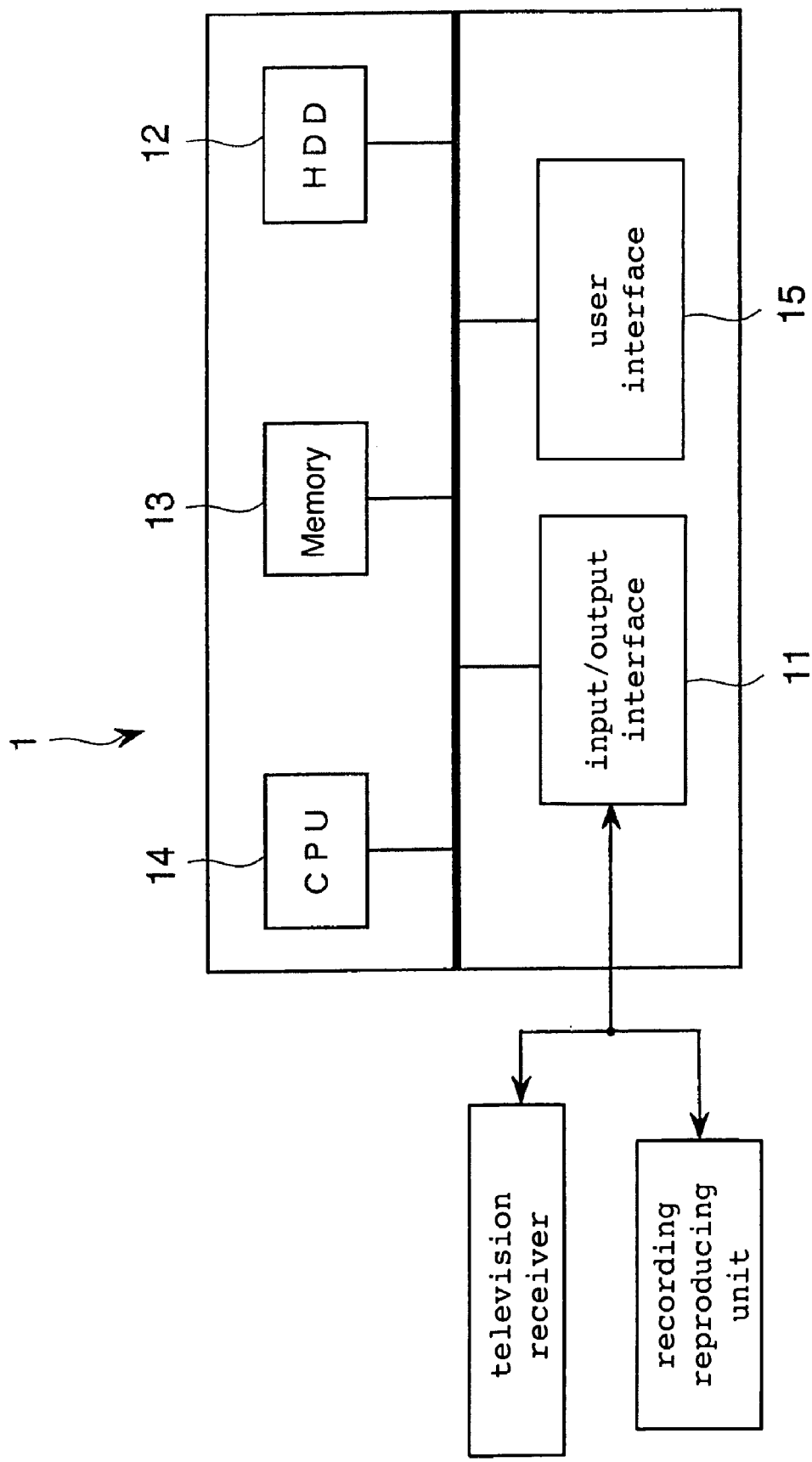
FIG. 1 is a system configuration diagram of an image recognition system in accordance with one embodiment of the present claimed invention.
Figure 2:
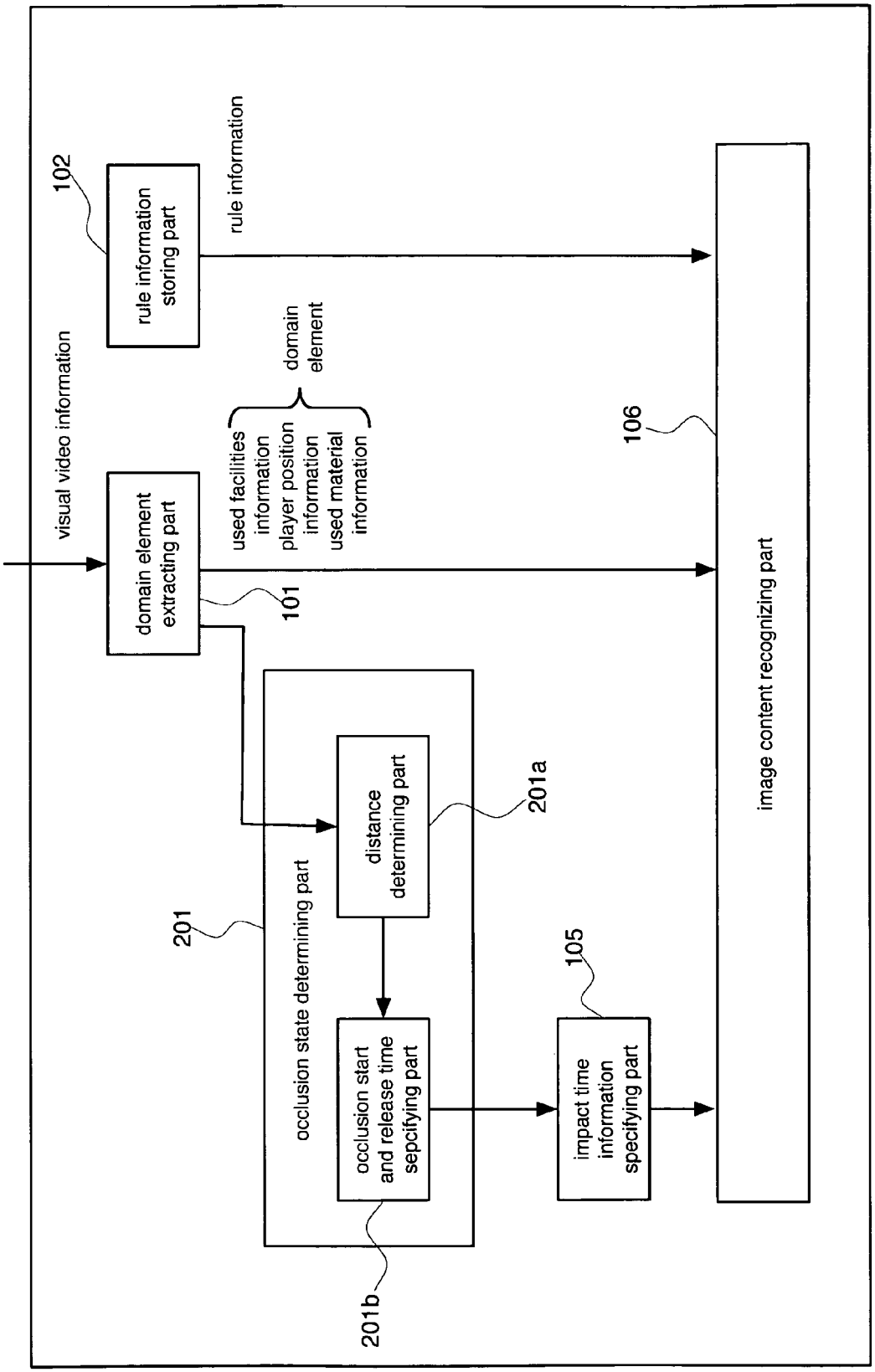
FIG. 2 is a functional block diagram in accordance with the embodiment.

FIG. 1 is a system configuration diagram showing a system configuration of an image recognition system in accordance with this embodiment. FIG. 2 is a functional block diagram in accordance with this embodiment.

The image recognition system in accordance with this embodiment recognizes a distinctive motion of a player during a match from content regarding a sport of an on air program displayed by the use of a television receiver or a recording/reproducing unit such as a VTR or recorded by a recording media, and comprises, as shown in FIG. 1, an input/output interface 11 an external memory unit 12 such as an HDD or an internal memory 13 that memorizes data or programs, a CPU 14 that runs according to the program memorized in the external memory unit 12 so as to work as an image recognition system 1, and a user interface 15 such as a keyboard or a mouse that receives user information from a user. "Content" here is set to include a motion of a player, a shot filmed at an angle from above so that a tennis court is filmed longwise and a shot of a judge or audiences taken in close-up, and voice of commentators or the like. In this embodiment, a tennis program will be explained as an example of "the content".

Next, the image recognition system 1 will be explained in terms of a function. When the CPU 14 is activated, the image recognition system 1 serves as, as shown in FIG. 2, a domain element extracting part 101, a rule information storing part 102, an occlusion state determining part 201, an impact time information specifying part 105, and an image content recognizing part 106.

Each component will be explained below.

The domain element extracting part 101 extracts used facilities information such as an obstacle like a net and a court line as being a boundary line showing a boundary between a court as being a partitioned area and an outside court, player position information showing a position of players and used material information showing an used material that moves between the areas and that becomes the object to count the score of the relevant sport from visual information displayed on a television receiver, and is so arranged to produce a part of functions as being a visual information obtaining part that obtains visual information in which a motion of at least one of the players is shown from the content. In this embodiment, the used facilities information to be extracted is set to be a court line and a net line, the player position information to be extracted is set to be position information of the player 1 and position information of the player 2, and the used material information to be extracted is set to be a tennis ball (hereinafter called as "a ball"). Furthermore, the used facilities information, the player position information and the used material information extracted by the domain element extracting part 101 are collectively called as a domain element.

Figure 3:
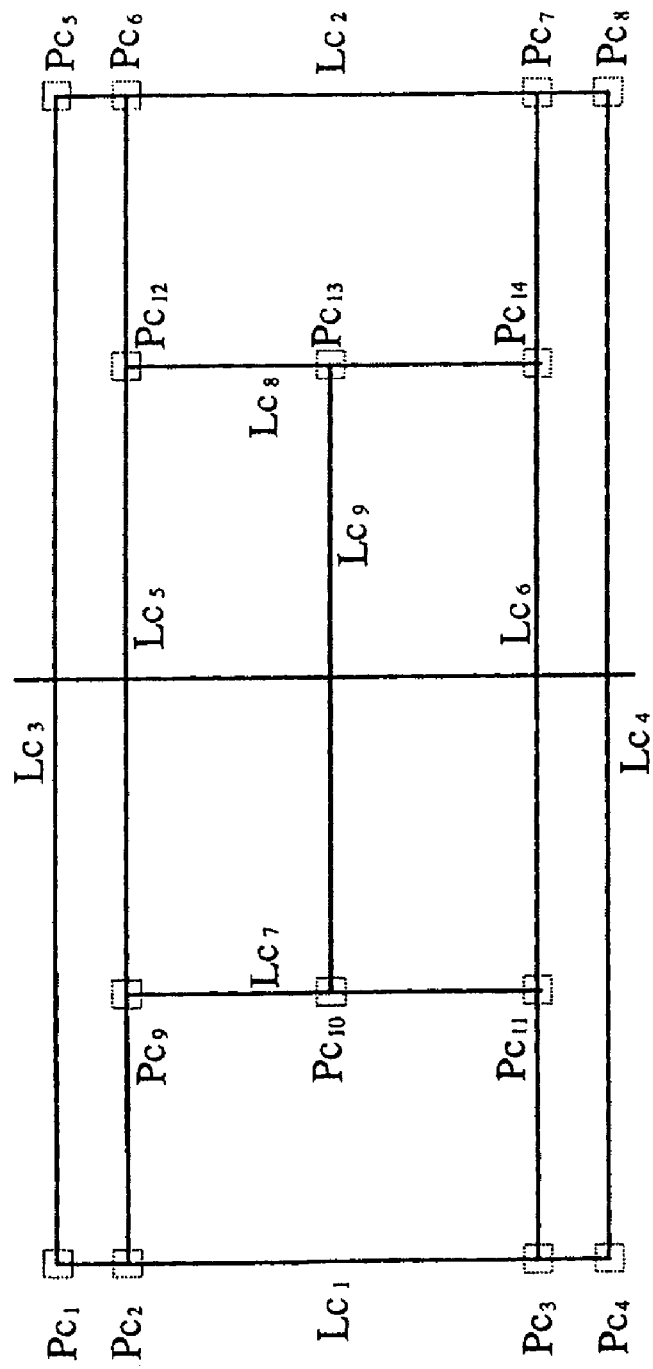
FIG. 3 is a diagram showing a court model used for extracting a court line from visual information in accordance with the embodiment.
Figure 4:
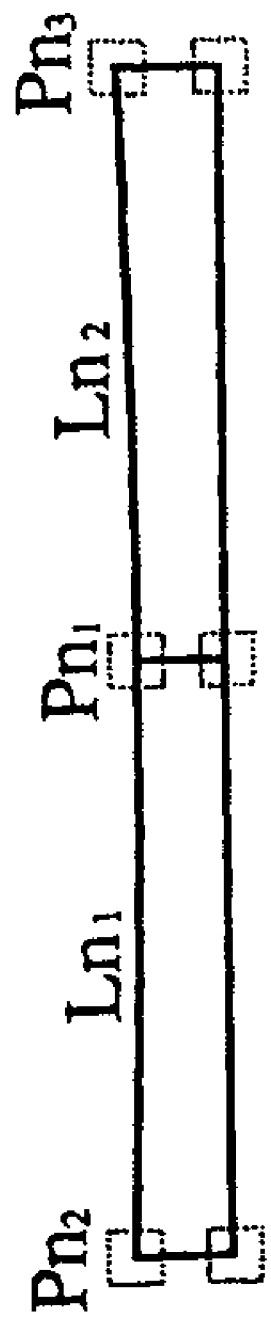
FIG. 4 is a diagram showing a net model used for extracting a net line from the visual information in accordance with the embodiment.

More concretely, in order to extract the used facilities information, it is so set to refer to a court model that sets court characteristic points $Pc_1, \ldots, Pc_{14}$ (hereinafter collectively called "Pc") that show representative points of the court lines and the court lines $Lc_1, \ldots, Lc_9$ (hereinafter collectively called "Lc") as shown in FIG. 3, and a net model that sets net characteristic points $Pn_1, \ldots, Pn_3$ (hereinafter collectively called "Pn") that show representative points of the net lines and net lines $Ln_1, Ln_2$ (hereinafter collectively called "Ln") as shown in FIG. 4, and to extract the court lines and the net lines in sequence from the visual information.

The court lines are extracted by detecting the court characteristic points from the visual information. More specifically, it is so set that the initial characteristic point $Pc(0)$ is input at time t=0, next each line for the court line $Lc(0)$ determined by $Pc(0)$ is transformed on the Hough plane and a detecting window $Wc(0)$ of $w_{th}$, $w_{ro}$ in size is prepared for each peak point around its center on the Hough plane. As a method for inputting the initial characteristic point $Pc(0)$, either one of the methods can be adopted: an operator makes use of the user interface 15 and inputs the initial characteristic point $Pc(0)$, and the image recognition system 1 automatically detects the initial characteristic point $Pc(0)$ and inputs it. In addition, it is so set to obtain a logical product of a digitalized image $B(t)$ of an original image and a neighbor area of the court line $Lc(t-1)$ at time t=t so as to produce a digitalized image $Bc(t)$ consisting of only the court neighborhood (hereinafter called "a court line digitalized image"). Then Hough transform is performed for each line of the digitalized image $Bc(t)$, a peak is detected within a range restricted by each detecting window $Wc(t-1)$, the court characteristic point $Pc(t)$ is updated, Hough transform is performed for the court line $Lc(t)$ again and then the detecting window $Wc(t)$ is also updated so as to extract the court line from the visual information. In case that the court characteristic point strays from the display due to a panning movement of a camera or the like, it is so set that the court characteristic points $Pc_i(t)$ (i=9, 10, 12, 13 or 10, 11, 13, 14) locating at a center of the court are assumed to be always shown in the display, and all of the court characteristic points are updated by the use of connecting knowledge with estimating the points outside the display. With the same reason, some initial characteristic points may be omitted. The connecting knowledge is defined based on knowledge conducting the relevant sport such that a partitioned area whose meaning can be created on a court model can be arranged, for example, if the court characteristic points $Pc_i(t)$ (i=9, 10, 12, 13) at the center of the court are connected.

Next, in order to extract the net line, it is so set that the initial characteristic point $Pn(0)$ at time t=0 is input, and the net line Ln(0) and the detecting window Wn(0) are prepared for each line like the court line, meanwhile an image Bn(t)=B(T)−Bc(t) that is obtained by eliminating the court line binary image from a binary image of the original image is produced as a net line binary image at time t=t and Hough transform is performed for the net line binary image and the peak is detected in the detecting window and then the characteristic point Pn(t) is updated.

Figure 5:
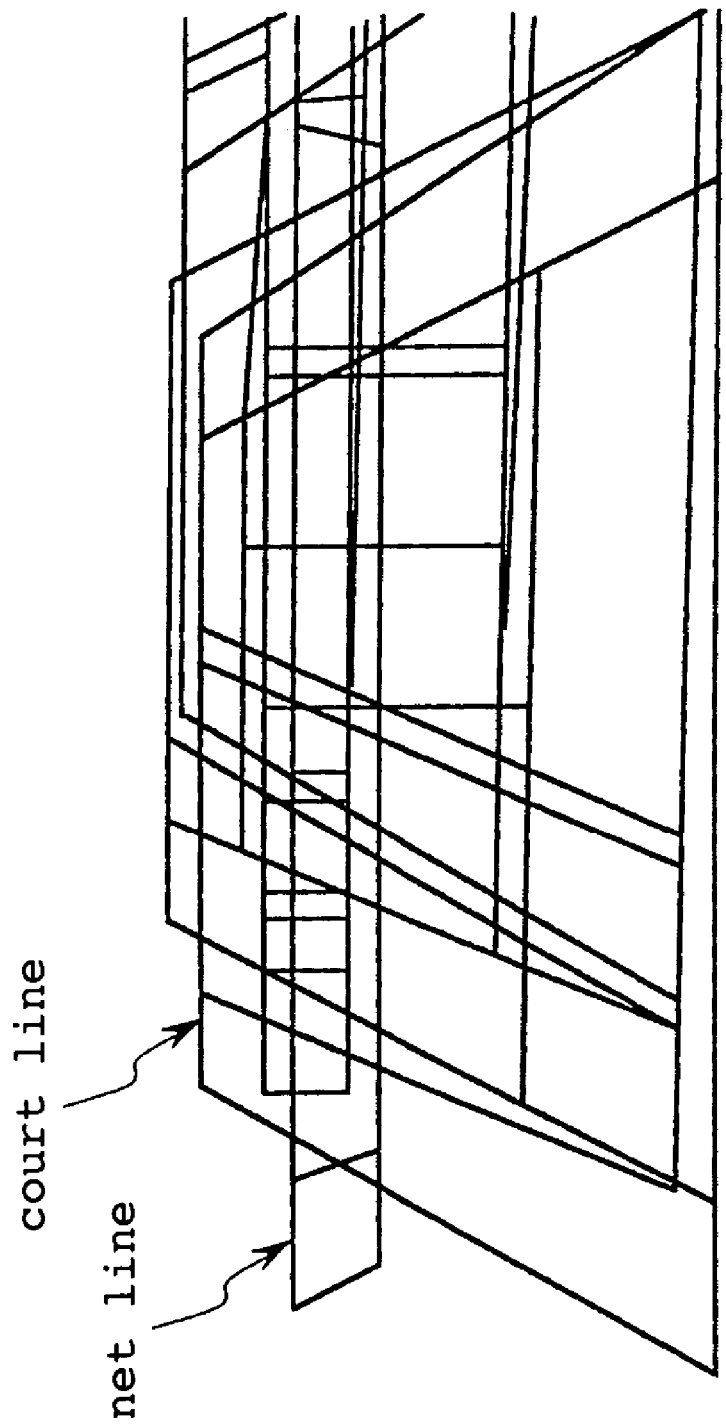
FIG. 5 is a diagram showing the court line and the net line extracted from the visual information in accordance with the embodiment.

As mentioned above, the court lines and the net lines can be extracted as shown in FIG. 5.

Next, it is so arranged that the player position information is extracted by specifying a region where an overlapped portion becomes the maximum in the binary image wherein the court lines and the net lines are eliminated from the visual information.

Figure 6:
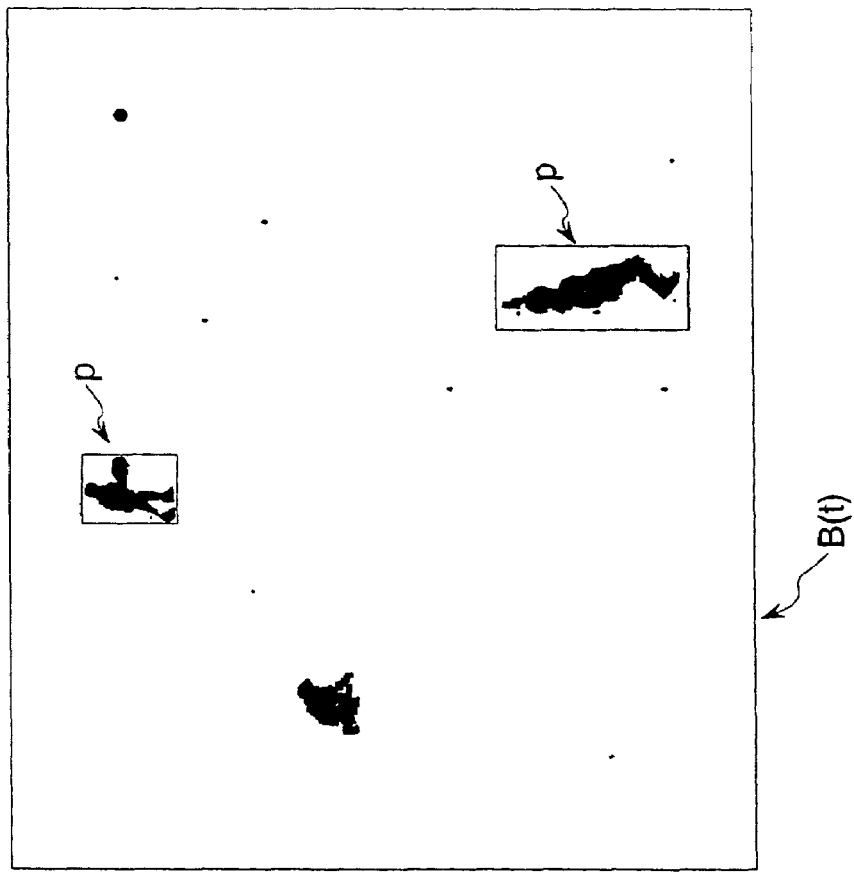
FIG. 6 is a diagram showing detection of a player region in accordance with the embodiment.

More concretely, binary images $B_1(t)$, $B_2(t)$ are produced at an appropriate threshold by obtaining a difference between images separated back and forth by "s" frame at time t=t. Where $B_1(t)=BIN(I(t)-I(t-s))$, $B_2(t)=BIN(I(t+s)-I(t))$. Where BIN is a function showing that a parenthetic argument is binarized. Then the court lines and the net lines are eliminated based on a binarized image $B_{diff}(t)$ obtained as a result of an AND operation of these two difference images and a binarized image $B_{label}(t)$ wherein a prepared color included in a color cluster corresponding to a representative color such as a uniform of the player at a point of the image I(t) at time t=t is set to be 1. Furthermore, the domain that is considered to eliminate a portion overlapping the player region is interpolated by a scaling process. Then thus obtained two images are processed with an OR operation and a binarized image B(t) as shown in FIG. 6 is obtained. A labeling process is conducted for a connecting region in the binarized image B(t), several frames are monitored in order to avoid a noise effect and a region having an area greater than or equals to a certain amount near the court is set to be an initial position of the player. Then a region existing near a player region at the time t=t−1 and whose area difference is the minimum among regions whose area is greater than or equals to a certain amount at time t=t is determined as a player region p at time t=t so as to obtain the player position information.

Then in accordance with a distance between thus extracted player position information and the ball, the ball is extracted by switching from a detecting mode to a tracking mode and vice versa.

Figure 7:
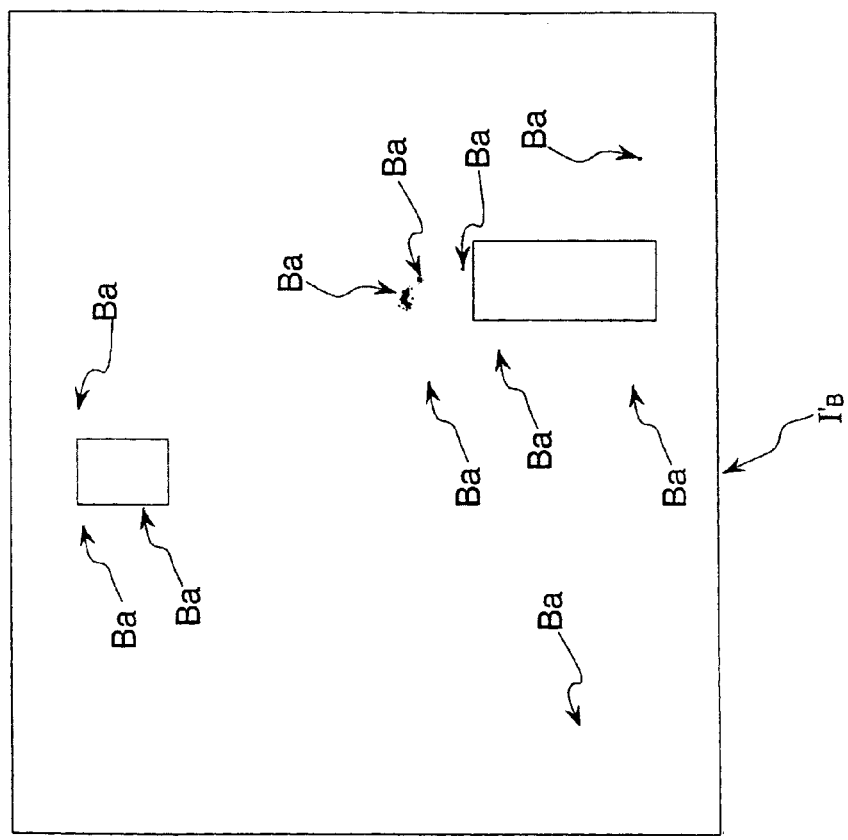
FIG. 7 is a diagram showing detection of a ball region in accordance with the embodiment.

If described more specifically, as shown in FIG. 7, the detecting mode is to detect all of the ball candidate positions Ba that coincide with a template $T_b(x, y)$ in the region near the player in the image $I'_B$ where the player region p is eliminated at time t based on the predetermined template $T_b(x, y)$ including the previously prepared ball of $b_x \times b_y$ in size. It is possible for the detecting mode to detect the ball candidates at the time t=t+1, t+2, ... also, to narrow down the ball candidate Ba that is detected continuously in a radial pattern around the player position, and to specify a combination of the ball candidate Ba that has finally left as a ball locus BW at the time zone. The template $T_b(x, y)$ is a kind of a tool arranged to extract the ball from the visual information, and in this embodiment the size of the ball displayed scale-up or scale-down in the image is tentatively set to be $b_x \times b_y$ and a region a little expanded outside from an outer circumferential of $b_x \times b_y$ is set to be the template.

The tracking mode is to track the ball locus BW by template matching with the template $T_b(x, y)$. At this time searching is conducted with the ball locus BW being assumed to be approximated on a straight line during an infinitesimal time and a position wherein a displacement that has been detected at the previous time is added to a current frame being as a prediction center. When a distance between the player region p and the position of the ball candidate Ba becomes smaller than a certain threshold level, it is so set that the detecting mode is conducted, otherwise, the tracking mode is repeatedly conducted.

Then as mentioned above, the ball locus BW at an arbitrary time zone can be obtained as shown in FIG. 8. In FIG. 8, the ball locus BW is displayed to overlap the visual information at an arbitrary time in order to show the ball locus BW easily to understand.

The rule information storing part 102 stores the rule information necessary to conduct the sport in question and is formed in a predetermined area of the external memory unit 12 or the internal memory 13. More concretely, the rule information stores, for example, as shown in FIG. 9, an indexed rule information index "a serving" that is defined as rule information "A server stands with his or her both legs landing on a ground behind the base line toward the net and between a virtual extension of the center mark and a virtual extension of the side line just prior to initiating a serving. The server tosses a ball with his or her hand at any direction in the air and hits the ball with a racket before the ball drops on the ground. The serving is considered to be completed at the moment the ball makes a contact with the racket." and a rule information index "the ball drops on the court line" is defined as the rule information "The ball drops on the court line is considered to drop in the court sectioned by the court line."

The occlusion state determining part 201 determines whether or not the ball extracted by the domain element extracting part 101 is in a state hidden by the player region p as being a predetermined object body. In this embodiment, the occlusion state determining part 201 comprises a distance determining part 201a that determines whether or not the ball extracted by the domain element extracting part 101 locates within a predetermined distance from the player region p and an occlusion start and release time specifying part 201b that specifies a moment when the distance determining part 201a determines that the ball locates within the predetermined distance from the player region p and the ball changes its state from being hidden by the player region p to not being hidden by the player region p as an occlusion start time and that specifies the time when the distance determining part 201a determines that the ball locates within the predetermined distance from the player region p and the ball changes its state from not being hidden by the player region p to not being hidden by the player region p as an occlusion release time.

Figure 10:
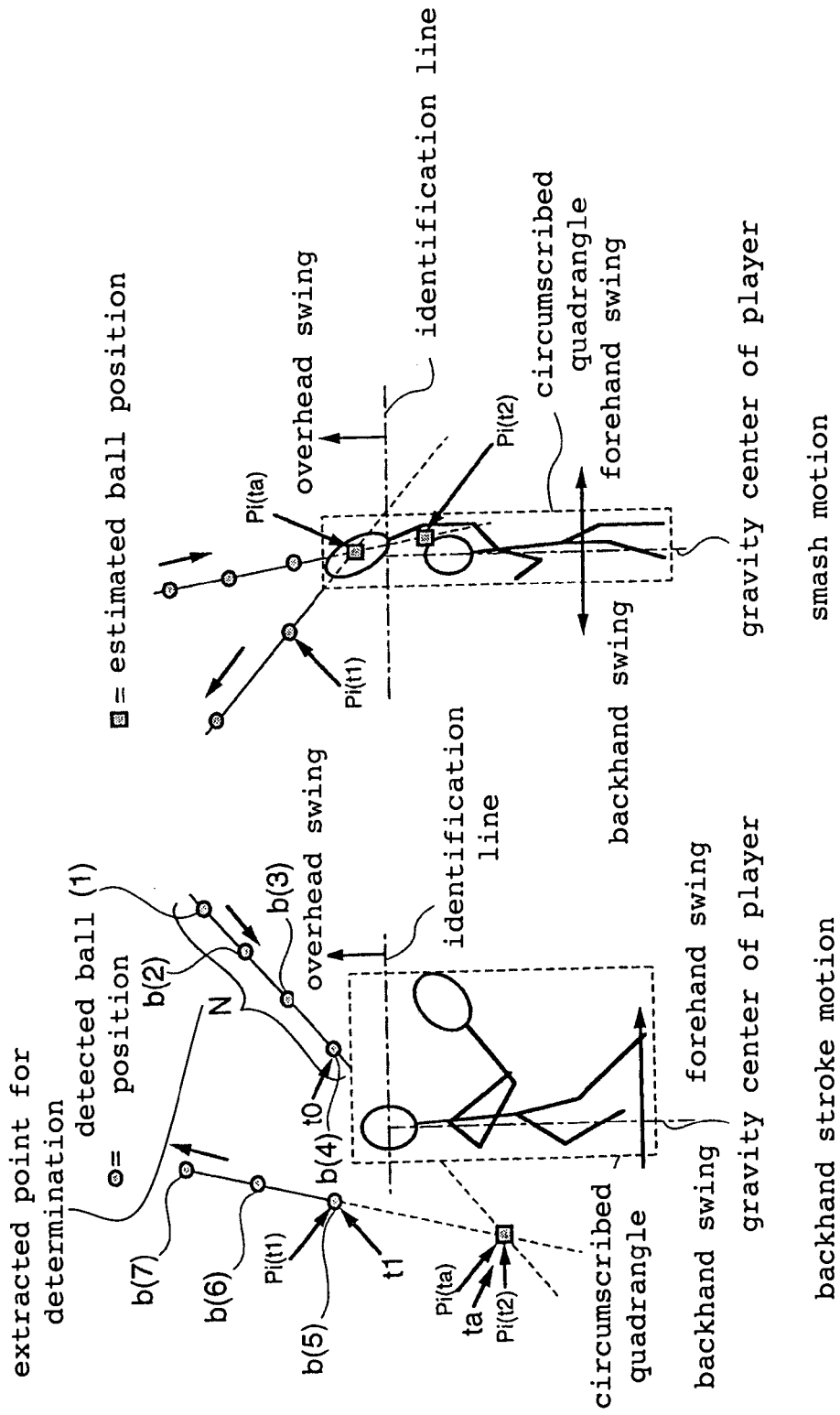
FIG. 10 is a diagram showing an aspect to identify a motion of the player in accordance with the embodiment.

More specifically, as shown in FIG. 10, the position of the detected ball determined to locate within a predetermined range from the player region p by the distance determining part 201a is assumed to be b(1) through b(7). Then the occlusion start and release time specifying part 201 specifies the time when the ball position just before the ball is hidden by the player region p as the concealing initiation time t0 and the time when the ball position just after the ball appears from the player region p as the occlusion release time t1.

In this embodiment, a state that the ball hides behind the player region p is defined as "an occlusion state", however, the state including a state that the ball overlaps ahead the player region p may be defined as "the occlusion state". In addition, the hidden predetermined object body is not limited to the player region p, but may be the used facilities information such as the net line or the court line.

The impact time information specifying part 105 specifies the impact time $t_a$ based on the occlusion start time t0 and the occlusion release time t1 specified by the occlusion start and release time specifying part 201b.

More concretely, the impact time $t_a$ is specified by performing an arithmetical operation with substituting the occlusion start time t0 and the occlusion release time t1 specified by the occlusion start and release time specifying part 201b for the following expression (Expression 1).

$$T_a = a \times t0 + (1-a) \times t1 \quad \text{(Expression 1)}$$

Figure 12:
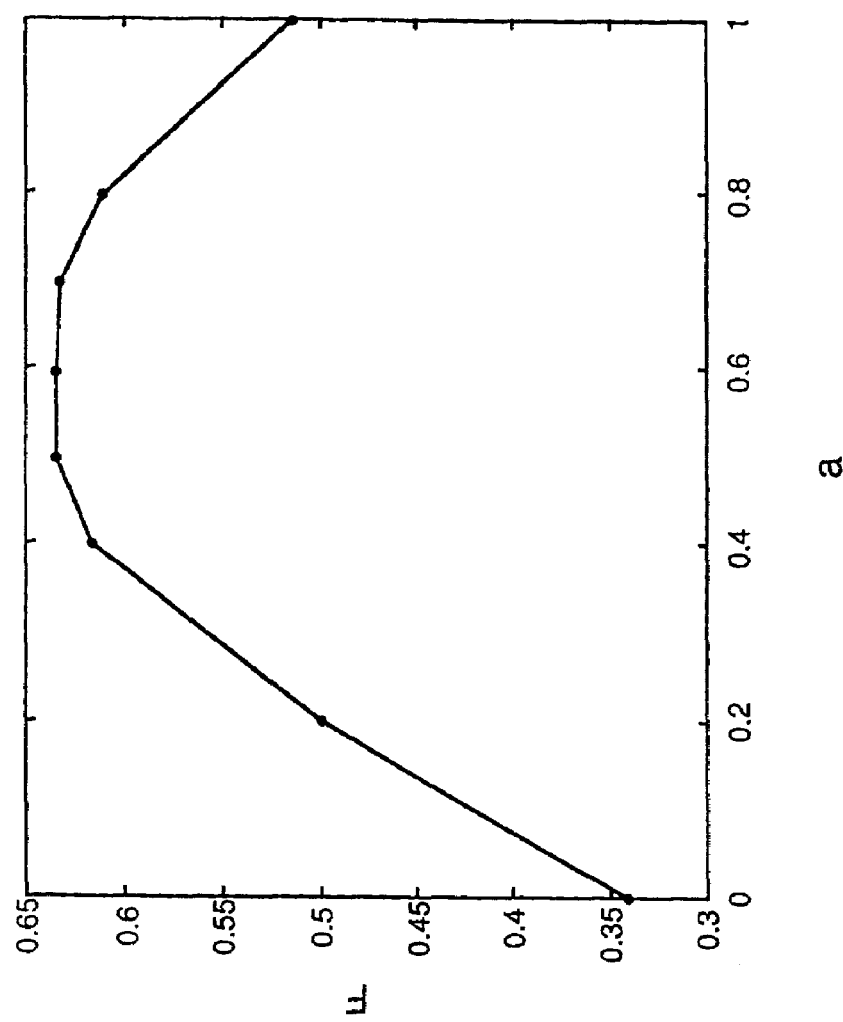
FIG. 12 is a diagram showing a relationship between a coefficient "a" and a measure "F" value of a comprehensive detection accuracy.

In this embodiment, either one of 0.5 or 0.6 whose total detecting accuracy is higher is set as the coefficient a based on FIG. 12, however, a value of the coefficient a is not limited to this, and the value of the coefficient a may be set differently for one of the player and the other player. "The total detecting accuracy" is obtained by the expression $F=2PR/(P+R)$. Where P is a relevance ratio, (P)=extracted number of correct data/extracted number of data, and R is a recall ratio, (R)=extracted number of correct data/number of data to be extracted.

In addition, a number of significant figures of the impact time $t_a$ may be set arbitrarily in accordance with an embodiment. For example, the obtained value of the impact time $t_a$ may be a value approximate to an integral number with an appropriate method or a value rounded within a significant digit.

The image content recognizing part 106 recognizes the image content including a motion of the player shown by the visual information based on the court line, the net line the player position information and the ball position extracted by the domain element extracting part 101, the position of the used material at the impact time $t_a$ specified by the impact time information specifying part 105, and the rule information stored in the rule information storing part 102.

More concretely, as shown in FIG. 10, it is so set that a ball position $P_i(t_a)$ at the impact time $t_a$ specified by the impact time information specifying part 105 is obtained and a motion of the player is determined based on the ball position $P_i(t_a)$ and the player position: if the ball at the impact time $t_a$ locates above the distinction line of the upper part of the circumscribed quadrangle surrounding the player, the motion of the player is determined as "overhead swing", and if the ball locates at the foreside or backside to the gravity center of the player, the motion of the player is determined as "forehand swing", and "backhand swing" respectively. The distinction line is set above the player region determined at a certain ratio in accordance with a longitudinal length of the circumscribed quadrangle surrounding the player.

Figure 11:
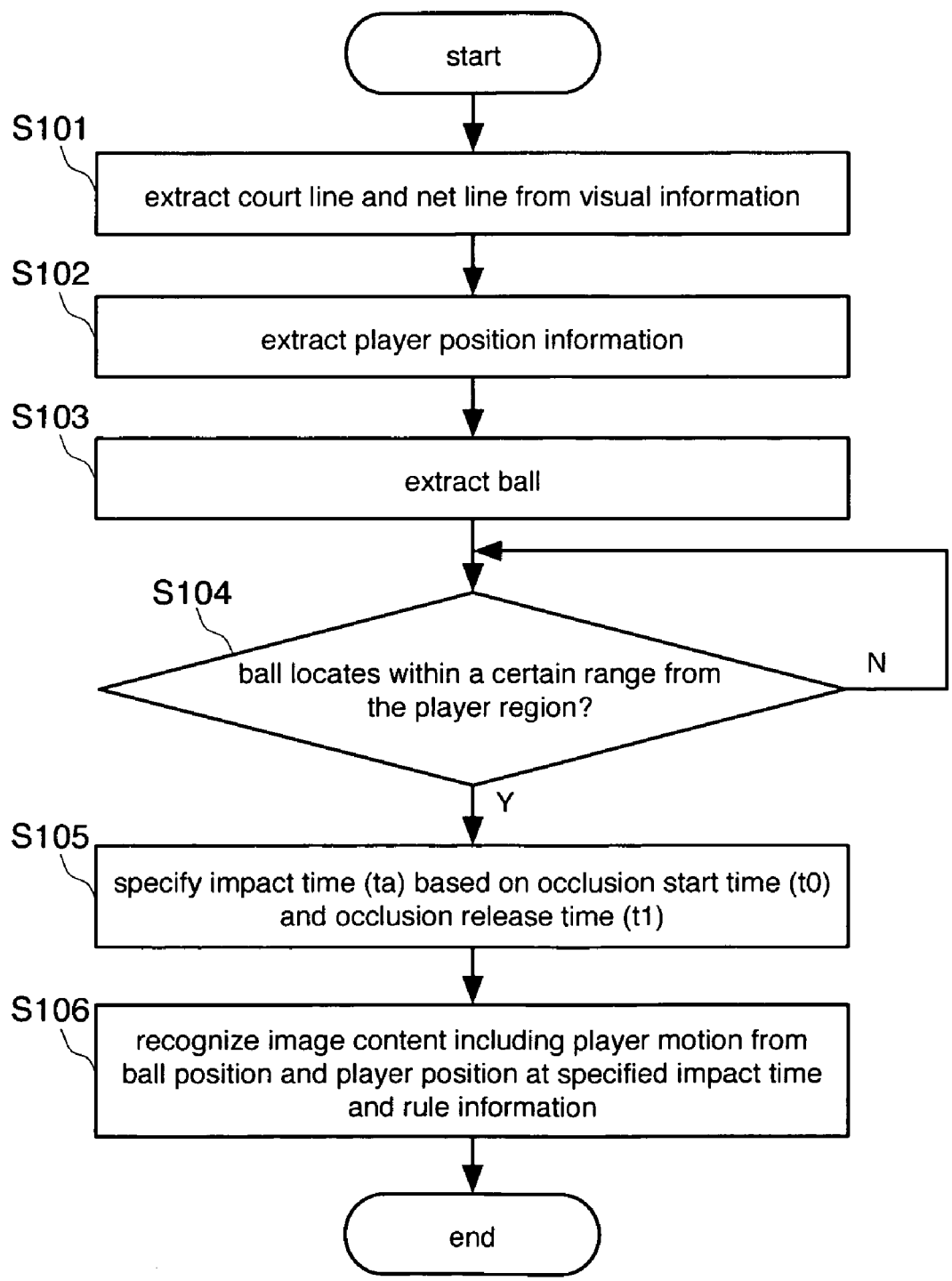
FIG. 11 is a flow chart showing a process to recognize an image from the visual information in accordance with the embodiment.

Next, a motion of the image recognition system in accordance with this embodiment will be explained by the use of the flow chart shown in FIG. 11.

First, the court line and the net line are extracted respectively from the visual information on which the motion of the player during the match is shown (Step S101), the player position information is extracted by the use of the binary image wherein the court line and the net line are eliminated from the visual information (Step S102). Then the ball is extracted from the visual information based on the extracted player position information (Step S103). Next, if the occlusion state judging part 201 judges that the extracted ball locates within a predetermined range to the player region p (Step S104), the impact time information specifying part 105 specifies the impact time $t_a$ based on the occlusion start time t0 and the occlusion release time t1 obtained by the occlusion start and release time specifying part 201b (Step S105). As shown in FIG. 10, it is possible to recognize the image content in three kinds of motions; "forehand swing" expressing a forehand swing motion, "backhand swing" expressing a backhand swing motion and "overhead swing" expressing an overhead swing motion based on the ball position and the player position at thus specified impact time $t_a$ in spite of a case that the image recognition is deterred, for example, the ball overlaps the player or the ball is hidden by the player (Step S106).

As mentioned above, in case that the image recognition is difficult, for example, in a case that it is difficult to specify the position of the used material because the used material overlaps or is hidden by the obstacle such as the player or the net in the image, since the impact time information specifying part 105 specifies the impact time when the used material is hit based on the occlusion start time when the occlusion state determining part 201 determines that the used material is transferred from the state that the used material is not hidden by the object to the state that the used material is hidden by the object and the occlusion release time when the occlusion state determining part 201 determines that the used material is transferred from the state that the used material is hidden by the object to the state that the used material is not hidden by the object, and furthermore the image content recognizing part 106 specifies the motion of the player without fail based on the specified impact time, the visual information on which the motion of the player during the match is shown and the rule information to conduct the relevant sport, it is possible to provide the image recognition system that is superior in image recognition and that can avoid recognition failures of a forehand swing, a backhand swing and an overhead swing due to, for example, overlapping or hiding of the used material with a relatively moderate price. It is a matter of course that the image recognition can be conducted preferably even in a case that the ball overlaps the player or the ball is hidden by the player.

In this embodiment, the content is set as a tennis program and the used facilities information as being the domain element extracted from the visual information is set as the court line and the net line, however, it is a matter of course that the used facilities information to be extracted is changed to others if the content is changed to other sport program. In addition, the player position information and the used material information are also changed accordingly.

Furthermore, in this embodiment it is so arranged that the distinctive motion of the player during the match is recognized from the content regarding the sport of an on air program displayed by the use of a television receiver or a recording/reproducing unit such as a VTR or recorded by a recording media, however, the media to be an object to the content to which the image recognition is conducted is not limited to this embodiment, for example, a distinctive motion of the player during the match is recognized from a prior to broadcasting raw image of the relevant sport that has been taped in a stadium or visual information archived in the Internet.

In addition, in this embodiment it is so arranged that the image content recognizing part 106 recognizes the image content including the motion of the player shown by the visual information from a viewpoint of three kinds of motions; "forehand swing" expressing a forehand swing motion, "backhand swing" expressing a backhand swing motion and "overhead swing" expressing an overhead swing motion, however, "stay" expressing a motion of the player staying to the spot and "move" expressing a moving motion of the player may be recognized based on a relationship between the ball position and the player position. In addition, if the rule information to be stored in the rule information storing part 102 is stored in a condition of being defined to be more complicated including various motions of the player, it is possible for the image content recognizing part 106 to recognize more complicated motions of the player.

In this embodiment, the ball is extracted from the visual information by the use of the predetermined template $T_b(x, y)$ including the ball of the $b_x \times b_y$ in size, however, the ball may be extracted without using the template.

<The Second Embodiment>

Figure 13:
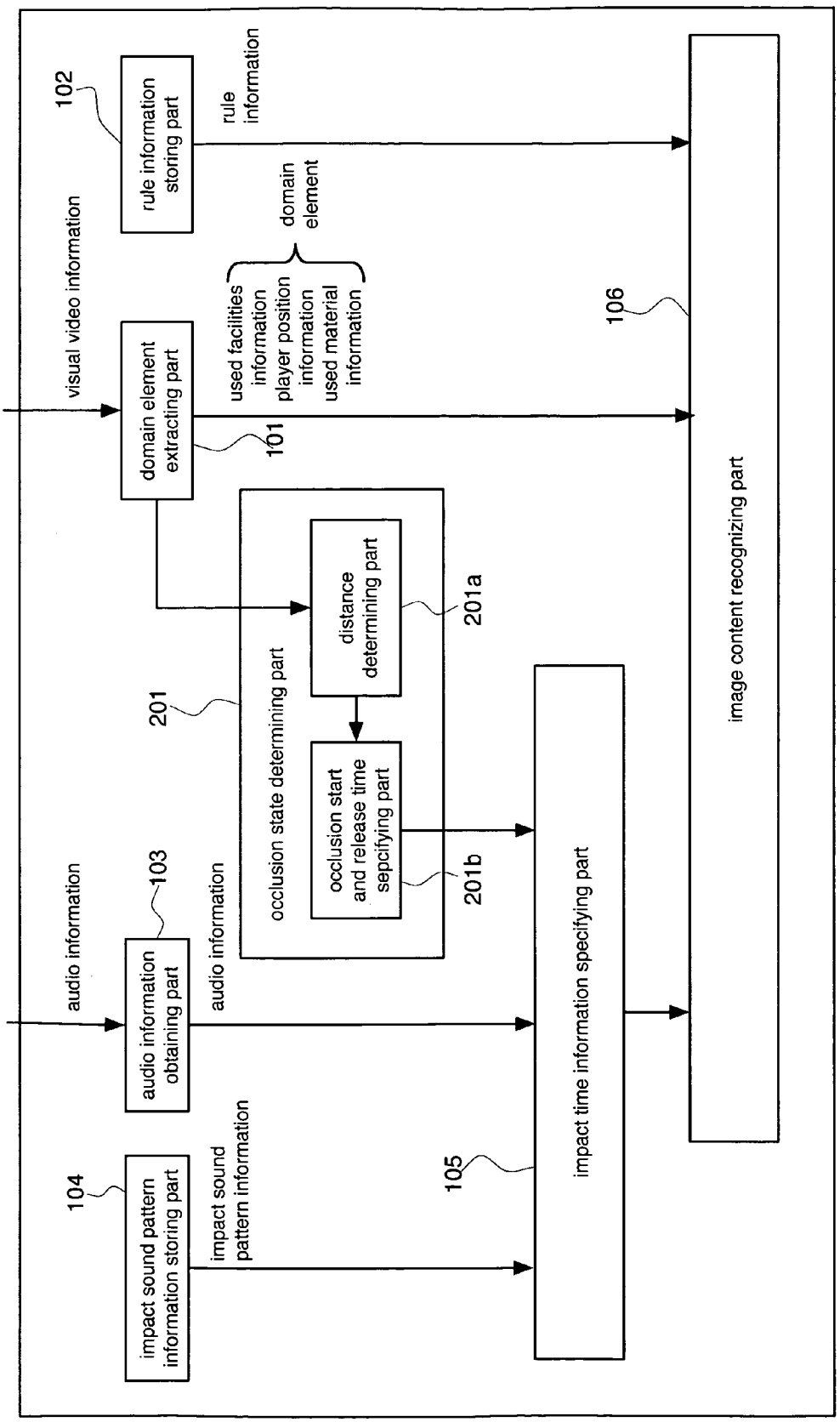
FIG. 13 is a functional block diagram of an image recognition system in accordance with another embodiment of the present claimed invention.
Figure 14:
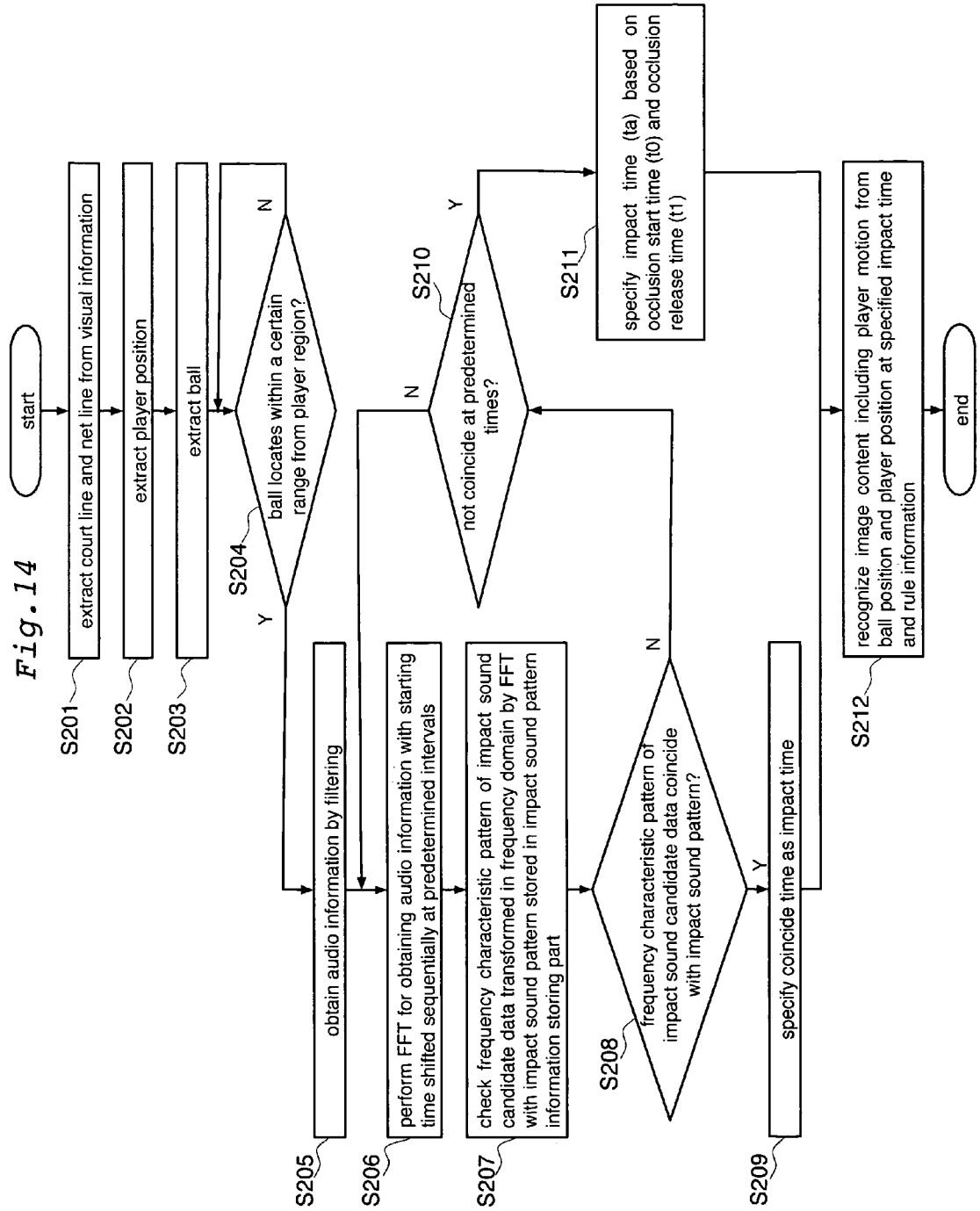
FIG. 14 is a flow chart showing a process to recognize an image from the visual information in accordance with the embodiment.

Other embodiment in accordance with this present claimed invention will be explained with reference to FIG. 13 through FIG. 14.

A component to which the same name or the code is given without specific explanation has the same arrangement and the same function as that of the first embodiment.

Like the image recognition system in accordance with the first embodiment, an image recognition system in accordance with this embodiment recognizes a distinctive motion of a player during a match from a content regarding to a sport of an on air program displayed by the use of a television receiver or a recording/reproducing unit such as a VTR or recorded by a recording media. Since a system configuration of the image recognition system is the same as that of the first embodiment, an explanation will be omitted.

Next, the image recognition system 1 will be explained in terms of a function. When a CPU 14 is activated, the image recognition system 1 serves as, as shown in FIG. 13, a domain element extracting part 101, a rule information storing part 102, an occlusion state determining part 201 comprising a distance determining part 201a and an occlusion start and release time specifying part 201b, an audio information obtaining part 103, an impact sound pattern information storing part 104, an impact time information specifying part 105 and an image content recognizing part 106.

Each component will be explained below.

Since each of the domain element extracting part 101, the rule information storing part 102, and the occlusion state determining part 201 is the same as that of the first embodiment, an explanation will be omitted.

The audio information obtaining part 103 obtains audio information including an impact sound generating at a moment when the ball is hit from the content, and is so set to obtain the audio information by sampling at 44.1 kHz with the resolution of 16 bits. In this embodiment, a filtering part, not shown in drawings, is arranged in the audio information obtaining part 103 so as to extract the impact sound only by filtering audio information other than the impact sound such as a sound generating, for example, at a time when shoes of the player rasps the court, a sound of the wind or other undesired sound. More specifically, the filtering part is a band-pass filter that passes a predetermined frequency band and that comprises a digital circuit such as an FIR filter or an IIR filter, and in this embodiment it is so set to pass a signal component of the frequency band of 100 Hz through 1500 Hz.

The impact sound pattern information storing part 104 stores a variation of the sound due to a condition that a ball is hit by a racket as the impact sound pattern information that is patterned by classifying into kinds of a stroke such as an impact sound at a time of smash and an impact sound at a time of a forehand stroke coordinated with a predetermined frequency and an amplitude value at the predetermined frequency and is formed in a predetermined area of the external memory unit 12 or the internal memory 13. The sound other than a sound generating when the racket hits the ball such as a sound that the ball makes when the ball rebounds from the court may be stored.

The impact time information specifying part 105 specifies an impact time $t_a$ based on the occlusion start time t0 and the occlusion release time t1 specified by the occlusion start and release time specifying part 201b (method M1), and the impact sound pattern information stored in the impact sound pattern information storing part 104 and the audio information obtained by the audio information obtaining part 103 (method M2).

More concretely, the time when the ball approaches within a certain distance from the player region p is set as t_d0 and the time when the ball gets away from the player more than a certain distance is set as t_d1. Then an impact time is detected by the use of the method M2 using the audio information during a period [from t_d0 to t_d1]. If the impact time is detected, the detected impact time is adopted as the impact time $t_a$. If failed due to detecting leakage, the impact time $t_a$ is specified by the use of the method M1 $t_a$=approx (a×t0+(1−a)×t1). Where approx (x) represents a function approximating x by the use of an appropriate method. In addition, a cause of "detecting leakage" can be a case that audio information necessary to specify the impact time can not be obtained in a good condition due to a condition that a microphone is installed, a mixing condition during broadcasting or a condition of a data transmission path. Furthermore, in case that the impact time obtained by the method M2 matches the impact time obtained by the method M1, if the obtained impact time is arranged to be specified as the impact time, an accuracy to specify the impact time can be dramatically improved.

The methods M1 and M2 will be described below, however, since the method M1 is the same as the method for obtaining the impact time $t_a$ in the first embodiment, an explanation will be omitted.

The method M2 will be explained.

The impact time information specifying part 105 performs Fast Fourier Transform for each of the 2048 (≈0.046 seconds) samples segmented from the audio data obtained by the audio information obtaining part 103 with a starting time in the segmentation shifted every 128 points (≈0.0029 seconds) and checks a frequency characteristic pattern of the audio information transformed in a frequency domain at each time with the impact sound pattern information stored in the impact sound pattern information storing part 104. As a result of this checking, if the frequency characteristic pattern of the audio information coincides with the impact sound pattern information, the impact time information specifying part 105 specifies the coincided time as the impact time $t_a$ of the ball and outputs the specified impact time $t_a$ to the image content recognizing part 106. In this embodiment, whether or not the frequency characteristic pattern of the audio information coincides with the impact sound pattern information is determined by the use of a correlation function and the frequency characteristic pattern of the audio information is considered to coincide with the impact sound pattern information if the correlation function is larger than a predefined threshold.

Since the image content recognizing part 106 is the same as that of the first embodiment, an explanation will be omitted.

Next, a motion of the image recognition system in accordance with this embodiment will be explained by the use of a flow chart shown in FIG. 14.

First, the court line and the net line are extracted respectively from the visual information on which a motion of the player during the match is shown (Step S201), the player position information is extracted by the use of the binary image wherein the court line and the net line are eliminated from the visual information (Step S202). Then the ball is extracted from the visual information based on the extracted player position information (Step S203). Next, if the ball locates within a predetermined range to the player region p (Step S204), the filtering part obtains the audio information including impact sound generating at a moment when the ball is hit from the content by filtering (Step S205), Fast Fourier Transform is performed for the audio information obtained by filtering with the starting time shifted sequentially at predetermined intervals (Step S206). Then the frequency characteristic pattern of impact sound candidate data obtained by performing Fast Fourier Transform at each time is checked with the impact sound pattern information stored in the impact sound pattern information storing part 104 (Step S207). If the checked result shows that the frequency characteristic pattern of the impact sound candidate data coincides with the impact sound pattern information (Step S208), the coincided time is specified as the impact time $t_a$ of the ball (Step S209). If the checked result shows otherwise (Step S208), the frequency characteristic pattern of the impact sound candidate data at its subsequent time is checked with the impact sound pattern information (Step S207).

In the Step S208, if the frequency characteristic pattern of the impact sound candidate data does not coincide with the impact sound pattern information for predetermined times (Step S210), the impact time information specifying part 105 specifies the impact time $t_a$ based on the occlusion start time t0 and the occlusion release time t1 obtained by the occlusion start and release time specifying part 201*b* (Step S211).

For example, as shown in FIG. 10, it is possible to recognize the image content in three kinds of motions; "forehand swing" expressing a forehand swing motion, "backhand swing" expressing a backhand swing motion and "overhead swing" expressing an overhead swing motion based on the ball position and the player position at thus specified impact time $t_a$ and the rule information in spite of a case that the image recognition is deterred, for example, the ball overlaps the player or the ball is hidden by the player (Step S212).

As mentioned above, in case that a position of the used material is difficult to specify because the used material overlaps or is hidden by an obstacle such as the player or the net in the image or the image recognition is difficult even though the audio information is used, since the impact time information specifying part 105 specifies the impact time when the used material is hit based on the occlusion start time when the occlusion state determining part 201 determines that the used material is transferred from the state that the used material is not hidden by the object to the state that the used material is hidden by the object and the occlusion release time when the occlusion state determining part 201 determines that the used material is transferred from the state that the used material is hidden by the object to the state that the used material is not hidden by the object, and furthermore the image content recognizing part 106 specifies the motion of the player without fail based on the specified impact time, the visual information on which the motion of the player during the match is shown and the rule information to conduct the relevant sport, it is possible to provide the image recognition system that is superior in image recognition and that can avoid recognition failures that can not be averted when using only the visual information, such as recognition failures of a forehand swing, a backhand swing and an overhead swing due to, for example, overlapping or hiding of the used material with a relatively moderate price. It is a matter of course that the image recognition can be conducted preferably even in a case that the ball overlaps the player or the ball is hidden by the player.

In addition, if the impact time is specified by the use of the impact time specified based on the audio information including the impact sound obtained by the audio information obtaining part 103 and by the use of the impact time obtained with the method M2, it is possible to provide the image recognition system with higher accuracy. In this case, even though the obtained audio information includes a noise sound other than the impact sound, it is possible to provide an image recognition with roust and high recognition rate because the filtering part can preferably filter the noise sound. Furthermore, since it is so arranged that a plurality pieces of the impact sound candidate data are obtained from the audio information and the impact time is specified based on the plurality pieces of the impact sound candidate data, it is possible to specify the impact time accurately. At this time, since the plurality pieces of the impact sound candidate data are so arranged that an impact sound candidate data and its subsequent impact sound candidate data have a time that overlaps each other, it is possible to avoid a failure of specifying the impact time.

In this embodiment, the content is set as a tennis program and the used facilities information as being the domain element extracted from the visual information is set as the court line and the net line, however, it is a matter of course that the used facilities information to be extracted is changed to others if the content is changed to other sport program. In addition, the player position information and the used material information are also changed accordingly.

Furthermore, in this embodiment it is so arranged that the distinctive motion of the player during the match is recognized from the content regarding to sport of an on-air program displayed by the use of the television receiver or the recording/reproducing unit such as a VTR, or recorded by a recording media, however, the media to be an object of the content to which the image recognition is conducted is not limited to this embodiment, and it may be, for example, a distinctive motion of the player during the match from a prior to broadcasting raw image of the relevant sport that has been taped in a stadium or visual information archived in the Internet.

In addition, in this embodiment it is so arranged that the image content recognizing part 106 recognizes the image content including the motion of the player shown by the visual information from a viewpoint of three kinds of motions; "forehand swing" expressing a forehand swing motion, "backhand swing" expressing a backhand swing motion and "overhead swing" expressing an overhead swing motion, however, "stay" expressing a motion of the player staying to the spot and "move" expressing a moving motion of the player may be recognized based on a relationship between the ball position and the player position. In addition, if the rule information to be stored in the rule information storing part 102 is defined in a more complicated state including various motions of the player, it is possible for the image content recognizing part 106 to recognize more complicated motion of the player.

In this embodiment, the ball is extracted from the visual information by the use of the predetermined template $T_b(x, y)$ including the ball of the $b_x \times b_y$ in size, however, the ball may be extracted without using the template.

In addition, the filtering part comprising the band-pass filter is arranged in the audio information obtaining part 103, however, the filtering part may comprise a filter other then the band-pass filter. Furthermore, the frequency band that the filtering part passes is not limited to 100 Hz through 1500 Hz.

In this embodiment, it is so set that the audio information obtaining part 103 obtains the audio information including the impact sound generating at the moment when the ball is hit from the content with the sampling grade of 44.1 kHz with the resolution of 16 bits, however, each of the resolution and the sampling is not limited to this.

In this embodiment, it is so set that the impact time information specifying part 105 performs Fast Fourier Transform for each of the 2048 (≈0.046 seconds) samples segmented from the audio data obtained by the audio information obtaining part 103 with a starting time in the segmentation shifted every 128 points (≈0.0029 seconds), however, the number of points with which the Fast Fourier Transform is performed is not limited to this and may be set to other value.

Furthermore, in this embodiment, it is so set whether or not the frequency characteristic pattern of the audio information coincides with the impact sound pattern information is determined by the use of a correlation function and the frequency characteristic pattern of the audio information is considered to coincide with the impact sound pattern information when the correlation function is larger than a predefined threshold, however, a method for determining whether or not the frequency characteristic pattern of the audio information coincides with the impact sound pattern information may be others.

Figure 15:
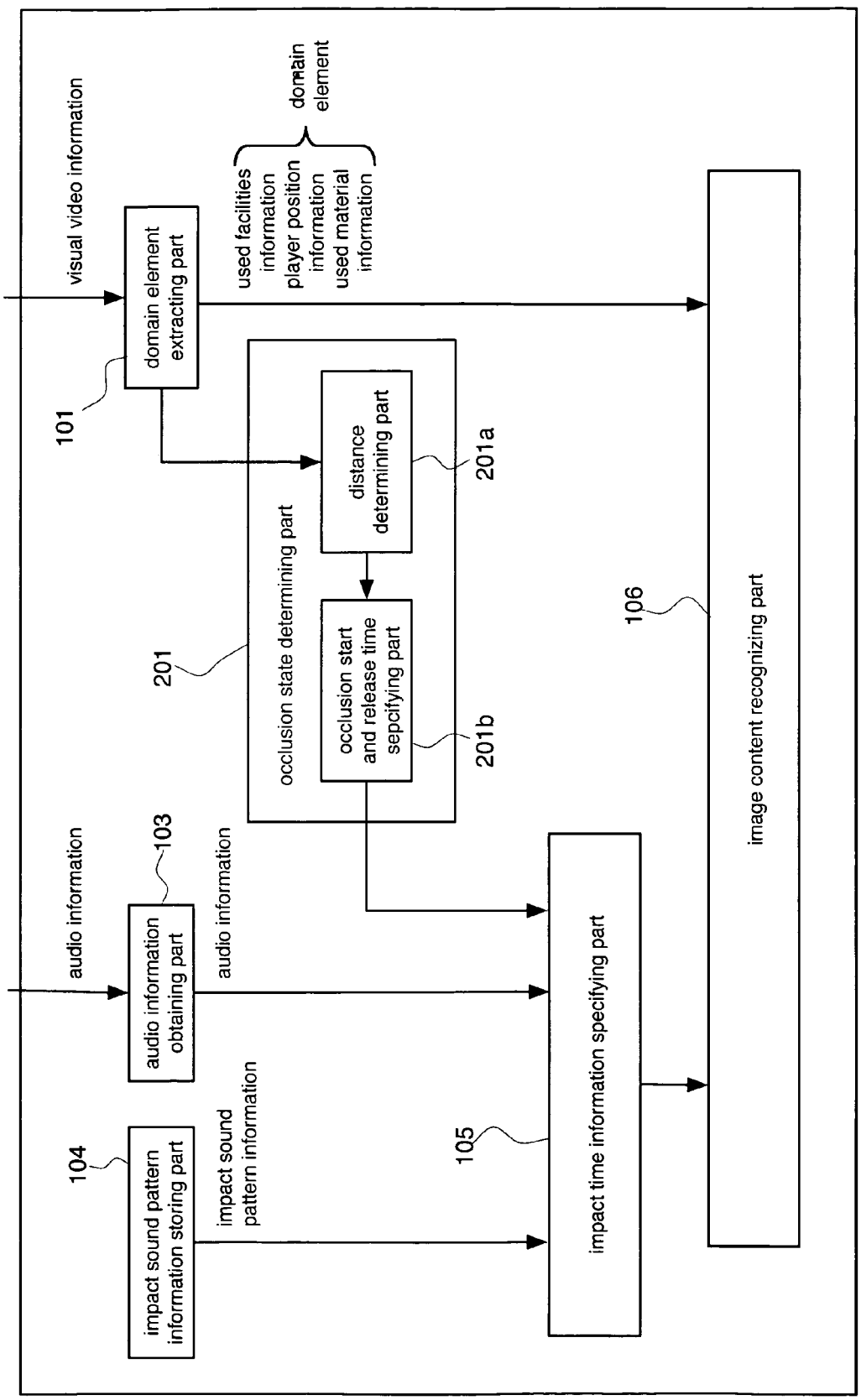
FIG. 15 is a functional block diagram of an image recognition system in accordance with further different embodiment of the present claimed invention.

In addition, as shown in FIG. 15, it can be conceived that the image recognition system 1 is so arranged that the image content recognizing part 106 recognizes the image content including the motion of the player shown by the visual information based on the visual information obtained by the visual information obtaining part and the position of the used material at the impact time specified by the impact time information specifying part 105. In accordance with this arrangement, it is possible to construct the system with a simple arrangement, and possible to expand the versatility of this system since this system can also be applied to a case in which no rule is established.

Other concrete arrangement of each component is not limited to the above-mentioned embodiment, and there may be various modifications without departing from a spirit of the present claimed invention.

POSSIBLE APPLICATIONS IN INDUSTRY

As mentioned above, in accordance with the present claimed invention, in case that the image recognition is difficult with using only the visual information, for example, in case that the position of the used material is difficult to specify because the used material overlaps or is hidden by the obstacle such as the player or the net in the image, since the impact time information specifying part specifies the impact time when the impact sound is generated based on the audio information including the impact sound obtained by the audio information obtaining part and the image content recognizing part specifies the motion of the player without fail based on the specified impact time, the visual information on which the motion of the player during the match is shown and the rule information to conduct the relevant sport, it is possible to provide the image recognition system that is superior in image recognition and that can avoid recognition failures of a forehand swing, a backhand swing and an overhead swing due to, for example, overlapping or hiding of the used material such as the recognition failures that can not be averted when using only the visual information with a relatively moderate price.

The invention claimed is:

1. An image recognition system that recognizes motions of players of a sport playing between areas partitioned by an obstacle such as a net from a content of its on-air program, of its material video before broadcasted, or recorded by a recording media such as a VTR, and characterized by comprising a visual information obtaining device that obtains visual information on which a motion of the player in at least one area during a match is shown from the content, an occlusion state determining device that determines whether or not a used material such as a ball that moves between the areas included in the visual information obtained by the visual information obtaining device and that is an object to count the score of the relevant sport is in a state being hidden by a predetermined object body, an impact time information specifying device that specifies an impact time when the used material is hit based on an occlusion start time when the occlusion state determining device determines that the used material changes its state from not being hidden by the object body to being hidden by the object and an occlusion release time when the occlusion state determining device determines that the used material changes its state from being hidden by the object body to not being hidden by the object, a rule information storing device that stores rule information to conduct the relevant sport, and an image content recognizing device that recognizes an image content including the motion of the player shown by the visual information based on the visual information obtained by the visual information obtaining device, a position of the used material at the impact time specified by the impact time information specifying device and the rule information stored in the rule information storing device.

2. The image recognition system described in claim 1, and characterized by that the occlusion state determining device comprises a distance determining device that determines whether or not the used material locates within a predetermined distance from the object body and an occlusion start and release time specifying device that specifies a moment when the distance determining device determines that the used material locates within the predetermined distance from the object body and the used material changes its state from not being hidden by the object body to being hidden by the object body as the occlusion start time and that specifies a moment when the distance determining device determines that the used material locates within the predetermined distance from the object body and the used material changes its state from being hidden by the object body to not being hidden by the object body as the occlusion release time.

3. The image recognition system described in claim 1, and characterized by that the impact time shown by $t_a$, the occlusion start time shown by t0 and the occlusion release time shown by t1 have a relationship shown by the following expression (Expression 1)

$$t_a = a \times t0 + (1-a) \times t1 \qquad \text{(Expression 1)}$$

where coefficient a is $0 \leq a \leq 1$.

4. The image recognition system described in claim 1, and characterized by that the visual information obtaining device comprises a domain element extracting device that extracts used facilities information such as the obstacle like the net or a boundary line showing a boundary between the areas and outside the areas, player position information showing a position of the player and used material information showing the used material that moves between the areas and that becomes the object to count the score of the relevant sport from the visual information.

5. The image recognition system described in claim 4, and characterized by that the player position information is position information showing a region including the player and a tool that the player always holds and uses during the match.

6. The image recognition system described in claim 4, and characterized by that the domain element extracting device extracts the player position information from the visual information based on the used facilities information extracted by the domain element extracting device.

7. The image recognition system described in claim 4, and characterized by that the domain element extracting device extracts the used material information from the visual information based on the used facilities information and the player position information extracted by the domain element extracting device.

8. The image recognition system described in claim 4, and characterized by that the used facilities information, the player position information, the used material information and the rule information are based on knowledge regarding a sport item to be a target to extract the image.

9. The image recognition system described in claim 1, and characterized by comprising an audio information obtaining device that obtains audio information synchronous with the visual information, such as an impact sound generating at a moment when the used material such as the ball that moves between the areas and that is an object to count the score of the relevant sport is hit from the content, wherein the impact time information specifying device specifies the impact time based on a combination of the occlusion start time and the occlusion release time and the audio information obtained by the audio information obtaining device.

10. The image recognition system described in claim 9, and characterized by that the impact time information specifying part specifies a time when the audio information shows a value bigger than a predetermined level as the impact time.

11. The image recognition system described in claim 9, and characterized by that the audio information obtaining device comprises a filtering device that passes a predetermined frequency band and the audio information is the information that has passed through the filtering device.

12. The image recognition system described in claim 11, and characterized by the filtering device consists of a band-pass filter.

13. The image recognition system described in claim 9, and characterized by that the impact time information specifying device specifies the impact time based on an impact sound candidate data having a predetermined time including the impact sound extracted from the audio information.

14. The image recognition system described in claim 9, and characterized by that multiple pieces of impact sound candidate data are extracted from the audio information so that an impact sound candidate data at one time and an impact sound candidate data at its subsequent time have a time that overlaps each other and the impact time information specifying device specifies the impact time based on the multiple pieces of the impact sound candidate data.

15. The image recognition system described in claim 14, and characterized by that each of the multiple pieces of the impact sound candidate data is arranged to have an identical data length and the multiple pieces of the impact sound candidate data are arranged to be extracted from the audio information at intervals of a certain period.

16. The image recognition system described in claim 9, and characterized by comprising an impact sound pattern information storing device that stores impact sound pattern information that is a patternized sound change due to a state under which the used material is hit by the tool such as a racket that the player always holds and uses during the match, wherein the impact time information specifying device specifies the impact time based on the impact sound pattern information stored in the impact sound pattern information storing device and the audio information.

17. An image recognition system that recognizes motions of players of a sport playing between areas partitioned by an obstacle such as a net from a content of its on-air program, of its material video before broadcasted, or recorded by a recording media such as a VTR, and characterized by comprising a visual information obtaining device that obtains visual information on which a motion of the player in at least one area during a match is shown from the content, an occlusion state determining device that determines whether or not a used material such as a ball that moves between the areas included in the visual information obtained by the visual information obtaining device and that is an object to count the score of the relevant sport is in a state being hidden by a predetermined object body, an impact time information specifying device that specifies an impact time when the used material is hit based on an occlusion start time when the occlusion state determining device determines that the used material changes its state from not being hidden by the object body to being hidden by the object and an occlusion release time when the occlusion state determining device determines that the used material changes its state from being hidden by the object body to not being hidden by the object, and an image content recognizing device that recognizes an image content including the motion of the player shown by the visual information based on the visual information obtained by the visual information obtaining device and a position of the used material at the impact time specified by the impact time information specifying device.

18. The image recognition system described in claim 17, and characterized by comprising an audio information obtaining device that obtains audio information synchronous with the visual information, such as an impact sound generating at a time when the used material such as the ball that moves between the areas and that is an object to count the score of the relevant sport is hit from the content, and the impact time information specifying device specifies the impact time based on a combination of the occlusion start time and the occlusion release time and the audio information obtained by the audio information obtaining device.

19. An image recognition program stored in a computer readable medium that is a program activating an image recognition system that recognizes motions of players of a sport playing between areas partitioned by an obstacle such as a net from a content of its on-air program, of its material video before broadcasted, or recorded by a recording media such as a VTR by operating a computer, and characterized by making the computer function as a visual information obtaining means that obtains visual information on which a motion of the player in at least one area during a match is shown from the content, an occlusion state determining means that determines whether or not a used material such as a ball that moves between the areas included in the visual information obtained by the visual information obtaining means and that is an object to count the score of the relevant sport is in a state being hidden by a predetermined object body, an impact time information specifying means that specifies an impact time when the used material is hit based on an occlusion start time when the occlusion state determining means determines that the used material changes its state from not being hidden by the object body to being hidden by the object and an occlusion release time when the occlusion state determining means determines that the used material changes its state from being hidden by the object body to not being hidden by the object, a rule information storing means that stores rule information to conduct the relevant sport, and an image content recognizing means that recognizes an image content including the motion of the player shown by the visual information based on the visual information obtained by the visual information obtaining means, a position of the used material at the impact time specified by the impact time information specifying means and the rule information stored in the rule information storing means.

20. An image recognition program stored in a computer readable medium that is a program activating an image recognition system that recognizes motions of players of a sport playing between areas partitioned by an obstacle such as a net from content of its on-air program, of its material video before broadcasted, or recorded by a recording media such as a VTR by operating a computer, and characterized by making the computer to function as a visual information obtaining means that obtains visual information on which a motion of the player in at least one area during a match is shown from the content, an occlusion state determining means that determines whether or not a used material such as a ball that moves between the areas included in the visual information obtained by the visual information obtaining means and that is an object to count the score of the relevant sport is in a state being hidden by a predetermined object body, an impact time information specifying means that specifies an impact time when the used material is hit based on an occlusion start time when the occlusion state determining means determines that the used material changes its state from not being hidden by the object body to being hidden by the object and an occlusion release time when the occlusion state determining means determines that the used material changes its state from being hidden by the object body to not being hidden by the object, and an image content recognizing means that recognizes an image content including the motion of the player shown by the visual information based on the visual information obtained by the visual information obtaining means and a position of the used material at the impact time specified by the impact time information specifying means.

* * * * *